United States Patent [19]

MacLean

[11] 3,736,531

[45] May 29, 1973

[54] ADJUSTABLE EQUALIZER CONTROL APPARATUS

[75] Inventor: Roderick Campbell MacLean, Atkinson, N.H.

[73] Assignee: Bell Telephone Laboratories, Inc., Murray Hill, N.J.

[22] Filed: Feb. 22, 1972

[21] Appl. No.: 227,741

[52] U.S. Cl. ....................................333/18, 325/65

[51] Int. Cl. ....................................H04b 3/04

[58] Field of Search ....................333/18, 28 R, 70 T; 325/42, 65

[56] References Cited

UNITED STATES PATENTS 3,573,667 4/1971 Kao et al. ..............................333/18

3,633,129 1/1972 Kao et al. ..............................333/18

*Primary Examiner*—Paul L. Gensler

*Attorney*—R. J. Guenther and William L. Keefauver

[57] ABSTRACT

In apparatus for controlling the several sections of an adjustable bump equalizer by solving a set of simultaneous equations relating equalizer misalignment to the effectiveness of each equalizer section, signal information descriptive of the effectiveness of each equalizer section as a function of the setting of that section is stored in a memory. When the equalizer is to be adjusted, this information is accessed on the basis of the present settings of the equalizer sections and the information thus retrieved is used in the processing of misalignment signal information.

12 Claims, 1 Drawing Figure

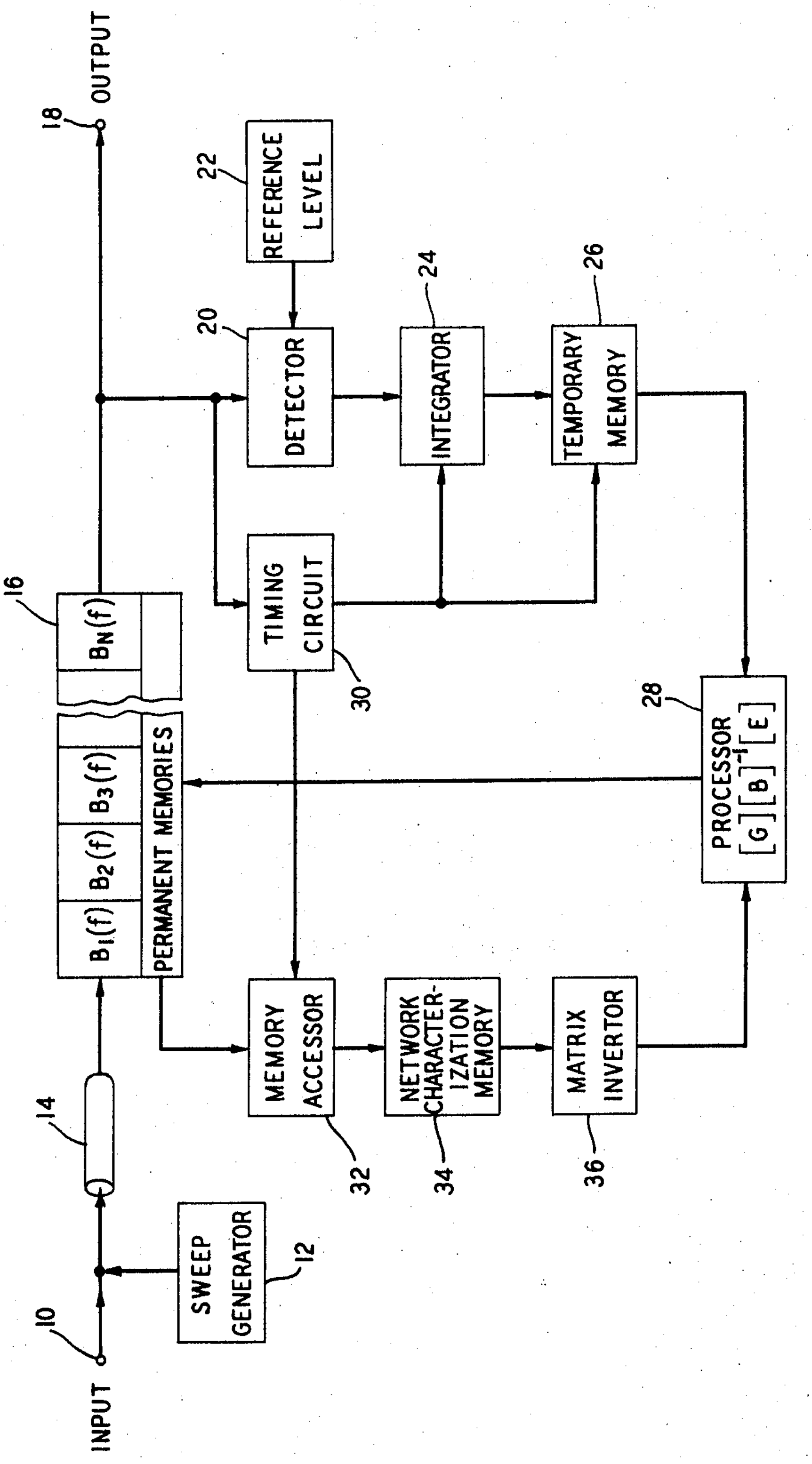
INPUT
10
SWEEP GENERATOR
12
14
$B_1(f)$
$B_2(f)$
$B_3(f)$
$B_N(f)$
16
PERMANENT MEMORIES
18
OUTPUT
REFERENCE LEVEL
22
DETECTOR
20
INTEGRATOR
24
TEMPORARY MEMORY
26
TIMING CIRCUIT
30
PROCESSOR $[G][B]^{-1}[E]$
28
MEMORY ACCESSOR
32
NETWORK CHARACTERIZATION MEMORY
34
MATRIX INVERTOR
36

ADJUSTABLE EQUALIZER CONTROL APPARATUS

BACKGROUND OF THE INVENTION

1. Field of the Invention

This invention relates to analog signal transmission systems and more particularly to automatic equalization in wide-band, analog communications systems.

2. Description of the Prior Art

In two concurrently filed patent applications, Ser. No. 227,739 and Ser. No. 228,079, C. Kao discloses systems for controlling the several sections of an adjustable bump equalizer. In both of these systems, a set of simultaneous linear equations relating transmission system misalignment to the effectiveness of each equalizer section at substantially all frequencies in the operating transmission band is solved to produce signal quantities for controlling the equalizer sections to reduce system misalignment. In both cases the measure of equalizer section effectiveness is the so-called normalized frequency response function of the section. It is assumed that the actual amplitude of the frequency response of an equalizer section at any frequency in the transmission band of the system is given by the product of the equalizer control quantity for that section and the normalized frequency response of the section at the specified frequency.

Another system for controlling an adjustable equalizer by solving a set of simultaneous equations is discussed by R. W. Ketchledge et al in "The L3 Coaxial System: Equalization and Regulation" (*Bell System Technical Journal*, Vol. 32, No. 4, July 1953, pp. 833–878, particularly pp. 842–851). In that system the equations solved relate transmission system misalignment at each of several pilot signal frequencies to the effectiveness of each equalizer section at each of those frequencies. Again, the measure of equalizer section effectiveness is the normalized frequency response function of the section, to which the actual frequency response of the section is assumed to be linearly related by the equalizer control quantity for that section.

In practice, there are several sources of nonlinearity in the relationship between the actual and normalized frequency response functions of typical adjustable equalizer sections. For many applications the assumption of linearity is adequate. In other applications, however, such precise equalization is required that this assumption is a major source of error. This is particularly true in extremely wide-band, analog communications systems operating at high frequencies.

It is therefore an object of this invention to improve automatic equalization in analog communications systems.

It is another object of this invention to provide adjustable equalizer control apparatus which does not rely on linearity in the equalizer control relationships.

It is still another object of this invention to provide apparatus for controlling an adjustable equalizer by solving a system or set of simultaneous equations relating equalizer misalignment to the effectiveness of each equalizer section which does not assume linearity in the equalizer control relationships.

SUMMARY OF THE INVENTION

These and other objects of the invention are accomplished, in accordance with the principles of the invention, by adjustable equalizer control apparatus in which an extensive characterization of the frequency response of each equalizer section as a function of the equalizer control quantity for that section is stored in a memory. When the equalizer is to be adjusted, this stored information is accessed on the basis of the present value of each equalizer control quantity. The information thus retrieved from the memory is used to generate a matrix needed in the processing of signals measuring the misalignment of the system.

Further features and objects of this invention, its nature, and various advantages, will be more apparent upon consideration of the attached drawing and the following detailed description.

BRIEF DESCRIPTION OF THE DRAWING

The single FIGURE of the drawing is a block diagram of an illustrative embodiment of adjustable equalizer control apparatus constructed in accordance with the principles of this invention.

DETAILED DESCRIPTION OF THE INVENTION

The principles of this invention are applicable to a wide variety of adjustable equalizer control strategies which rely on a precise characterization of the equalizer to be controlled. Particularly suitable for modification in accordance with the principles of this invention are equalizer control systems of the type mentioned above (i.e., the system of Ketchledge et al. and the two systems of Kao). The invention will be fully understood from a detailed discussion of its application to the system disclosed in the first of the above-cited applications of C. Kao.

Referring to the attached drawing, the operation of the Kao system can be briefly summarized as follows: When the transmission system apparatus including cable 14 and equalizer 16 requires realignment, that apparatus is disconnected at terminals 10 and 18. A test sweep signal having frequency varying monotonically across the transmission band of the system is generated by sweep generator 12 and applied to the transmission line. The amplitude of this signal as transmitted by the system is compared by detector 20 to a reference signal level supplied by reference source 22. This comparison is made for all frequencies in the test sweep signal to produce a signal progressively representative of the misalignment of the system at all frequencies in the transmission band. Integrator 24, responsive to control signals generated by timing circuit 30, integrates this misalignment signal over N separate frequency ranges in the transmission band to produce N integral misalignment quantities, each of which is applied to temporary memory 26. Temporary memory 26 may be any analog or digital memory suitable for storing the integral misalignment quantities. For example, memory 26 may comprise flip-flop registers. At the completion of the test sweep, temporary memory 26 contains a vector of N quantities, each representative of the misalignment of the system integrated over a predetermined frequency range in the transmission band of the system.

This vector of misalignment quantities is multiplied in processor 28 by the inverse of a matrix B and by a diagonal gain matrix G to produce a vector of N incremental equalizer adjustment quantities (one for each section of equalizer 16 to be adjusted). These incremental adjustment quantities are added to the N equalizer control quantities stored in the permanent memories of equalizer 16. Responsive to the changed control quantities, the N sections of equalizer 16 readjust to reduce the misalignment of the system. The permanent memory of equalizer 16 may be any analog or digital memory suitable for storing equalizer control quantities. For example, the permanent memory may comprise flip-flop registers.

The matrix B required in the above-described equalizer control apparatus is a characterization of the effectiveness of each equalizer section in each frequency range for which a misalignment signal has been determined. As discussed in detail in the first of the Kao applications cited above, a convenient measure of the effectiveness of an equalizer section is the so-called normalized frequency response function of the section. The actual amplitude of the frequency response of the equalizer section is then assumed to be linearly related to its normalized response function by the equalizer control quantity for the section. Each normalized frequency response function therefore expresses the sensitivity of the frequency response of the corresponding equalizer section to changes in its control quantity.

In accordance with relation 4 in the above-mentioned application of C. Kao, each element $B_{ij}$ of matrix B is determined by integrating the normalized frequency response function $B_i(f)$ for equalizer section $i$ over a frequency range $f_j$. In general, there are N frequency ranges $f_1$ through $f_N$ over which each normalized frequency response function must be integrated. These N frequency ranges correspond to the N frequency ranges over which the misalignment signal generated by detector 20 is integrated by integrator 24. Accordingly, the elements in each column of matrix B constitute the integrals over N distinct frequency ranges of the normalized frequency response function for a given equalizer section. Matrix B is therefore a characterization of the effectiveness of the several sections of equalizer 16. Matrix B expresses the sensitivity of equalizer 16 to adjustment of all of its control quantities.

As discussed above, the actual frequency response of a practical equalizer section is not related to its normalized response function by the corresponding equalizer control quantity with perfect linearity. Indeed in many cases, the actual control relationship is quite complex. Although the deviation from linearity may be small, it is important in some systems to compensate for as many such sources of error as possible.

Because of the complexity of the actual control relationships, control system apparatus for duplicating those relationships directly would be exceedingly difficult and expensive to construct. In accordance with the principles of this invention, a different approach to this problem is therefore taken. In effect, the nonlinearity of the control relationship for any given section of equalizer 16 means that the sensitivity of the equalizer section to the quantity controlling it changes as the equalizer section is adjusted. The sensitivity of the equalizer section is thereby regarded as a function of the control quantity for that section. Accordingly, when a section of equalizer 16 is adjusted, the elements in the column of matrix B describing the sensitivity of that equalizer section must be changed to reflect this change in sensitivity. In practice, of course, each adjustment of equalizer 16 typically involves adjusting several and perhaps all of the sections of equalizer 16. This necessitates changing all of the corresponding columns of sensitivity matrix B. Once a new matrix B has been determined, a further adjustment of equalizer 16 can be made. As long as each such adjustment is relatively small (as determined by the gain control quantities on the main diagonal of matrix G), the relationship between the actual frequency response functions of the several sections of equalizer 16 and the normalized frequency response functions of those sections (as currently characterized by matrix B) can be assumed to be linear. Accordingly, the equalizer is adjusted in small increments with a new matrix B being computed on the basis of present equalizer sensitivity before each adjustment is made. Again, the size of the adjustment increments is determined by the diagonal gain matrix G.

In order to generate successive sensitivity matrices B, information characterizing the sensitivity of each section of the equalizer as a function of the corresponding equalizer control quantity is stored in network characterization memory 34. Memory 34 may be any suitable analog or digital memory, for example, a digital read-only memory (ROM). The information stored in memory 34 may conveniently take the form of values of $B_{i1}$ through $B_{iN}$ for each equalizer section $i$ as a continuous or discrete function of the corresponding equalizer control quantity $b_i$. By "discrete function" it is meant that values of $B_{i1}$ through $B_{iN}$ for representative discrete values of $b_i$ can be stored in memory 32. The required data regarding these integral normalized frequency response quantities $B_{ij}$ can be readily predetermined from the design parameters and/or tests of the several sections of equalizer 16. When equalizer 16 is to be adjusted, timing circuit 30 activates memory accessor or addressor 32. Accessor 32 responds to the present value of each of equalizer control quantities $b_i$ stored in the permanent memories of equalizer 16 by addressing the portion of memory 34 in which values of $B_{i1}$ through $B_{iN}$ for that value of $b_i$ are stored. For each control quantity, N integral sensitivity quantities are thereby retrieved from memory 34. Each of these quantities represents the sensitivity of one section of equalizer 16 at the present value of the corresponding equalizer control quantity integrated over one of the N predetermined frequency ranges.

The N times N integral sensitivity quantities thus produced by memory 34 constitute the elements of an N by N matrix B which represents the sensitivity of equalizer 16 at its present setting. These quantities are applied to matrix invertor 36 which algebraically manipulates the applied quantities to compute the inverse of matrix B. Matrix invertor 36 may, therefore be any apparatus capable of computing the inverse of an applied matrix, e.g., any suitably programmed digital computing machinery. Programming methods for matrix inversion are discussed, for example, in Chapter 5 of *Introduction to Numerical Methods and FORTRAN Programming* by T. R. McCalla (John Wiley & Sons, Inc., 1967).

When computed by matrix invertor 36, matrix B inverse is applied to processor 28 for use in processing subsequently generated misalignment quantities to produce a set of N incremental equalizer control quantities in the manner described above. Processor 28 may, of course, be apparatus similar to the processor described in the system of C. Kao summarized above. The entire equalization process can be repeated as many times as necessary to achieve the desired level of equalization.

It will be understood that the principles of this invention are generally applicable to any adjustable equalizer strategy relying on a characterization of the equalizer to be controlled. In accordance with the principles of the invention, information of the type required to characterize the equalizer in a given system is stored in a memory as a function of the setting of the equalizer. When the equalizer is to be adjusted, the stored information is accessed on the basis of the present setting of the equalizer and the accessed information is used to process signals indicative of transmission system misalignment to generate signals for controlling the equalizer. In the equalizer control system disclosed in the second of the above-cited applications of C. Kao, for example, the matrix B needed in processor 60 can be generated from suitable stored information in accordance with the principles of this invention. Similarly, the equalizer characterization required in the equalizer control apparatus discussed by Ketchledge et al can be generated in accordance with the principles of this invention.

What is claimed is:

1. Apparatus for generating signals for controlling the frequency response of an adjustable equalizer in accordance with a characterization of the frequency response of the equalizer comprising:

means for storing a characterization of the frequency response of the equalizer as a function of the signals controlling the equalizer;

means responsive to the present level of the signals controlling the equalizer for accessing the stored characterization to produce signals representative of a characterization of the equalizer at the present level of the control signals; and means responsive to the present characterization signals for generating signals for controlling the equalizer.

2. In a transmission system including a transmission line and an adjustable equalizer responsive to the output signal of the transmission line, said equalizer having a plurality of independently adjustable equalizer sections, apparatus for generating signal quantities for controlling the frequency response levels of the several sections of the equalizer to reduce the misalignment of the transmission system comprising:

means for generating signals representative of the misalignment of said transmission system;

storage means for storing signals representative of the effectiveness of each equalizer section as a function of the corresponding equalizer control quantity;

accessing means responsive to each of said equalizer control quantities for accessing said storage means to produce signals representative of the effectiveness of each equalizer section at the present level of the corresponding control quantity; and means responsive to the signals produced by said accessing means for processing said misalignment signals to produce said equalizer control quantities.

3. In a transmission system including a transmission line and an adjustable equalizer responsive to the output signal of the transmission line, said equalizer having a plurality of equalizer sections the frequency response levels of which are controlled by signal quantities stored in permanent memories associated with said equalizer, apparatus for generating signal quantities for storage in said permanent memories to reduce the misalignment of the transmission system comprising:

means for generating signals representative of the misalignment of said transmission system;

storage means for storing signals representative of the sensitivity of the frequency response of each equalizer section to changes in the corresponding equalizer control quantity as a function of the corresponding control quantity;

accessing means responsive to each of said stored equalizer control quantities for accessing said storage means to produce signals representative of the sensitivity of each equalizer section at the present value of the corresponding control quantity; and means responsive to the signals produced by said accessing means for processing said misalignment signals to produce said signal quantities for reducing said misalignment.

4. In a transmission system including a transmission line and an adjustable equalizer responsive to the output signal of the transmission line, said equalizer having a plurality of equalizer sections the frequency response levels of which are controlled by a first plurality of signal quantities stored in memories associated with said equalizer, apparatus for generating a second plurality of signal quantities for modifying said first plurality of signal quantities to reduce the misalignment of the transmission system comprising:

means for generating signals representative of the misalignment of said transmission system;

storage means for storing signals representative of the sensitivity of the frequency response of each equalizer section to changes in the corresponding equalizer control quantity as a function of the corresponding control quantity;

accessing means responsive to each quantity in said first plurality of equalizer control quantities for accessing said storage means to produce signals representative of the sensitivity of each equalizer section at the present value of the corresponding control quantity; and means responsive to the signals produced by said accessing means for processing said misalignment signals to produce said second plurality of signal quantities.

5. In a transmission system including a transmission line and an adjustable equalizer responsive to the output signal of the transmission line, said equalizer having a plurality of equalizer sections the frequency response levels of which are controlled by a first plurality of signal quantities stored in memories associated with said equalizer, apparatus for solving a set of simultaneous equations relating transmission system misalignment to the effectiveness of each equalizer section in each of a plurality of frequency ranges in the transmission band of the system to produce a second plurality of signal quantities for modifying said first plurality of signal quantities to reduce said misalignment comprising:

means for generating signals representative of the misalignment of said transmission system in each of said frequency ranges;

storage means for storing signals representative of the effectiveness of each equalizer section in each of said frequency ranges as a function of the corresponding control quantity;

accessing means responsive to each quantity in said first plurality of equalizer control quantities for accessing said storage means to produce signals representative of the effectiveness of each equalizer section in each frequency range at the present value of the corresponding control quantity; and means responsive to the signals produced by said accessing means and to said misalignment signals for solving said set of simultaneous equations to produce said second plurality of control quantities.

6. The apparatus defined in claim 5 wherein said means for generating signals representative of the misalignment of said transmission system in each of said frequency ranges comprises:

means for applying a test signal of a predetermined amplitude to said transmission system; and means for comparing the amplitude of said test signal as transmitted by said transmission system to a predetermined reference amplitude to produce a misalignment signal.

7. The apparatus defined in claim 6 wherein said test signal is a sweep signal having frequency progressively representative of substantially all frequencies in the operating frequency band of said transmission system.

8. The apparatus defined in claim 7 wherein said means for determining the misalignment of the transmission system further comprises means for integrating said misalignment signal for each of said frequency ranges occurring in said test sweep signal to produce a vector of integral misalignment quantities.

9. The apparatus defined in claim 8 wherein the signals produced by said accessing means represent a matrix of signal quantities representative of the effectiveness of each equalizer section in each frequency range at the present value of the corresponding control quantity.

10. The apparatus defined in claim 9 wherein said means for solving said set of simultaneous equations comprises:

means for inverting said matrix of signal quantities produced by said accessing means; and means for multiplying said vector of integral misalignment quantities by the inverted matrix of signal quantities produced by said accessing means to produce said second plurality of control quantities.

11. In a transmission system including a transmission line and an adjustable equalizer responsive to the output signal of the transmission line, said equalizer having a plurality of equalizer sections the frequency response levels of which are controlled by a first vector of signal quantities stored in memories associated with said equalizer, apparatus for solving a set of simultaneous equations relating transmission system misalignment in each of a plurality of frequency ranges to the effectiveness of each equalizer section in each of a plurality of frequency ranges in the transmission band of the system to produce a second vector of signal quantities for modifying said first vector of quantities to reduce said misalignment comprising:

means for generating a vector of signal quantities representative of the misalignment of said transmission system in each of said frequency ranges;

storage means for storing signals representative of the effectiveness of each equalizer section in each of said frequency ranges as a function of the corresponding control quantity;

accessing means responsive to each quantity in said first vector of quantities for accessing said storage means to produce a matrix of signal quantities representative of the effectiveness of each equalizer section in each frequency range at the present value of the corresponding control quantities;

matrix inversion means for inverting the matrix produced by said accessing means;

matrix multiplication means for multiplying said vector of integral misalignment quantities by the inverse matrix produced by said matrix inversion means to produce said second vector of signal quantities; and means for applying said second vector of signal quantities to said equalizer for modification of said first vector of signal quantities.

12. The apparatus defined in claim 11 wherein said means for generating comprises:

means for applying a test sweep signal of a predetermined amplitude to said transmission system, said test sweep signal having frequency varying monotonically for all frequencies in the transmission band of the system;

means for comparing the amplitude of said test sweep signal as transmitted by said transmission system to a predetermined reference amplitude to produce an error signal; and means responsive to the frequency of said test sweep signal for integrating said error signal for each of said frequency occurring occuring in said test sweep signal to produce said vector of integral misalignment quantities.

* * * * *